(12) United States Patent  
Fukunaga et al.

(10) Patent No.: US 9,179,811 B2  
(45) Date of Patent: Nov. 10, 2015

(54) WORK APPARATUS

(71) Applicant: MAKITA CORPORATION, Aichi (JP)

(72) Inventors: Ko Fukunaga, Aichi (JP); Tomonobu Nashimoto, Aichi (JP); Yoshinori Shibata, Aichi (JP)

(73) Assignee: MAKITA CORPORATION, Aichi (JP)

( * ) Notice: Subject to any disclaimer, the term of this patent is extended or adjusted under 35 U.S.C. 154(b) by 0 days.

(21) Appl. No.: 14/504,946

(22) Filed: Oct. 2, 2014

(65) Prior Publication Data

US 2015/0113760 A1 Apr. 30, 2015

(30) Foreign Application Priority Data

Oct. 25, 2013 (JP) .................................. 2013-222768

(51) Int. Cl.
| | |
|---|---|
| A47L 5/14 | (2006.01) |
| A47L 9/28 | (2006.01) |
| A47L 9/24 | (2006.01) |
| E01H 1/08 | (2006.01) |
| H05F 3/02 | (2006.01) |

(52) U.S. Cl.
CPC . *A47L 5/14* (2013.01); *A47L 9/248* (2013.01); *A47L 9/2889* (2013.01); *E01H 1/08* (2013.01); *H05F 3/025* (2013.01)

(58) Field of Classification Search
CPC ........... A47L 5/14; A47L 9/2889; E01H 1/08; H05F 3/025
USPC .......................................... 15/327.5, 330, 405
IPC ......................................................... A47L 5/14
See application file for complete search history.

(56) References Cited

U.S. PATENT DOCUMENTS

| 7,979,958 B2 | 7/2011 | Raffenberg | |
|---|---|---|---|
| 2006/0185114 A1* | 8/2006 | Joos et al. | ................. 15/330 |
| 2009/0290999 A1* | 11/2009 | Yoshino et al. | ............... 417/364 |

FOREIGN PATENT DOCUMENTS

JP 2008-106660 5/2008

* cited by examiner

*Primary Examiner* — David Redding  
(74) *Attorney, Agent, or Firm* — Greenblum & Bernstein, P.L.C.

(57) ABSTRACT

A work apparatus is comprised of a blower unit including a drive motor, a volute casing, a fan rotatably supported within the volute casing and driven by the drive motor, and an airflow duct connected to the volute casing, thereby blowing out or sucking in air through the airflow duct; and of an airflow tube coupled to the airflow duct of the blower unit and having an open distal end for blowing out or sucking in air through the airflow tube. The airflow tube is provided with a grip handle adapted for being held and operated by the operator. Within the airflow tube is arranged an electrically conductive wire at least between the grip handle and the open distal end, beyond which is provided an electrically grounding wire connected to the electrically conductive wire and drooping therefrom to be touchable to earth.

6 Claims, 7 Drawing Sheets

WORK APPARATUS

TECHNICAL FIELD

The present invention relates to a work apparatus such as a blower apparatus and a suction apparatus comprising a power-operated blower unit and an airflow tube adapted to be used for blowing off fallen leaves or sucking in dust on the ground or the like. More particularly, the present invention relates to a work apparatus so contrived that electrostatic charge which would otherwise accumulate on the airflow tube during operation of the work apparatus could be effectively conducted away to earth.

BACKGROUND INFORMATION

Blower apparatuses have been conventionally known and used in the art as a kind of work apparatuses used for blowing off fallen leaves on the ground or the like. A blower apparatus comprises a power-operated blower unit and an airflow tube (blowoff tube). The blower unit includes a drive motor, a volute casing, a fan rotatably supported within the volute casing and driven by the drive motor, and an airflow duct (a blow-out duct) connected to the volute casing for blowing out air impelled by the fan. The airflow tube is coupled to the airflow duct of the blower unit to blow out air from the open distal end of the airflow tube. In this type of blower apparatus, the air flowing out from the airflow duct passes through the airflow tube before it blows out from the open distal end, which is apt to cause generation of electrostatic charge on the volute casing and the airflow tube by the friction between air (including dust) and the inner circumferential walls of the volute casing and the airflow tube. Under these circumstances, when the user or operator of the blower apparatus holds the grip handle provided on the airflow tube, the electrostatic charge accumulated on the airflow tube would burst through to the hand of the operator, giving a harsh attack to the operator.

Various configurations have been conventionally proposed in the art to avoid unwanted attack of electrostatic discharge. An example of blower apparatuses with an arrangement provided within the blower tube for avoiding electrostatic discharge attack is disclosed in JP 2008-106660 A. The arrangement comprises a charge removing conductive wire provided within the airflow tube and having a free end positioned at the logitudinally intermediate point of the airflow tube and another end led outside the airflow tube through between the straight tube component and the elbow tube component of the airflow tube and electrically connected to the engine via an electrically conductive wire. The other end of the charge removing conductive wire which is connected to the electrically conductive wire is folded back toward the air to constitute a discharging wire. When this blower apparatus is in operation to blow out air from the airflow tube, the electrostatic charge generated on the inner wall of the airflow tube is gathered by the charge removing conductive wire violently streaming within the airflow tube and is discharged mostly to the engine and partly to the air.

Another example of blower apparatuses with an arrangement provided within the blower tube for avoiding electrostatic discharge attack is disclosed in U.S. Pat. No. 7,979,958 B2. The arrangement comprises a potential compensating conductor having a free end positioned centrally in the blower tube and another end connected to the drive motor, and an electrically conductive configuration from the potential compensating conductor and the drive motor to the ground device through the body of the operator, so that the charges on the potential compensating conductor and on the drive motor can be conducted away into the ground.

With the first example as mentioned above in which the electrostatic charge generated in the airflow tube is conducted away to the engine via the charge removing conductive wire, a potential difference may be established between the engine and the operator, and the electrostatic charge accumulated on the engine may flow through the throttle wire which is for controlling the throttle valve of the engine or through the lead wire which is for stopping the engine, and may attack the operator's hand holding the grip handle to which both the wires are extended from the engine. The operator should feel very uncomfortable.

With the second example as mentioned above in which the electrostatic charge on the potential compensating conductor and the engine is expected to be conducted away to the ground through the operator, it would be hard to thoroughly discharge the accumulated charge. Both of the above mentioned inconveniences would be obviated by hanging a conductive chain from the engine to reach the ground, but such an arrangement would cause another inconvenience for the operator to erroneously step on the chain during the operation.

SUMMARY OF THE INVENTION

In view of the foregoing circumstances, therefore, it is a primary object of the present invention to obviate the above-mentioned inconveniences residing in the conventional work apparatuses, and to provide a work apparatus such as a blower apparatus and a suction apparatus in which the operator would not be attacked by electrostatic discharge from the airflow tube such as a blowoff tube and a suction tube which the user holds and operates when in use.

According to the present invention, the object is accomplished by providing a work apparatus comprising: a blower unit including a drive motor, a volute casing, a fan rotatably supported within the volute casing and driven by the drive motor, and an airflow duct connected to the volute casing, thereby blowing out or sucking in air through an airflow duct; an airflow tube coupled to the airflow duct of the blower unit and having an open distal end for blowing out or sucking in air through the airflow tube, the airflow tube being provided with a holding device adapted for being held and operated by the user when in use; an electrically conductive member arranged within the airflow tube at least in an range between a position where the holding device is provided and the open distal end of the airflow tube; and an electrically grounding member provided at the open distal end of the airflow tube and electrically connected to the electrically conductive member, the electrically grounding member being configured to be touchable to earth.

With the work apparatus configured as above in which an electrically conductive member is arranged within the airflow tube at least in the range between the position where the holding device is provided and the open distal end of the airflow tube, and in which an electrically grounding member electrically connected to the electrically conductive member and configured to be touchable to earth is provided at the open distal end of the airflow tube, the operator can easily have the electrically grounding member touch the ground while the operator is holding the grip handle of the airflow tube to blow out or suck in air through the airflow tube, whereby the electrostatic charge generated on the airflow tube will be discharged to the ground before attacking the operator's hands from the grip handle.

In the work apparatus configured as above, the electrically conductive member may be made of an electrically conductive wire extending from the position where the holding device is provided to the open distal end of the airflow tube, so that the electrostatic charge around the holding device would be effectively gathered and conducted away through the electrically grounding member to earth.

Further, in the work apparatus configured as above, the electrically conductive wire may be electrically connected to the drive motor, so that the electrostatic charge generated at the volute casing would be gathered by the drive motor and conducted away through the electrically conductive wire to earth.

Further, in the work apparatus configured as above, the electrically conductive wire may be further extended beyond the open distal end of the airflow tube and may droop from the open distal end to constitute the electrically grounding member, so that the drooping part would easily touch the ground, even though the operator should not carefully control the open distal end of the airflow tube to touch the ground while holding the grip handle.

Or alternatively, in the work apparatus configured as above, the open distal end of the airflow tube may be provided with an electrically conductive ring fitted and fixed thereto serving as the electrically grounding member, which ring may preferably be made of electrically conductive metal, so that the operator should simply touch the open distal end to the ground while in use, and the metal ring would prevent the distal end of the airflow tube from wearing off.

BRIEF DESCRIPTION OF THE DRAWINGS

For a better understanding of the present invention, and to show how the same may be practiced and will work, reference will now be made, by way of example, to the accompanying drawings, in which.

DETAILED DESCRIPTION OF EMBODIMENTS OF THE INVENTION

The invention and its various embodiments can now be better understood by turning to the following detailed description of the preferred embodiments with reference to the accompanying drawings. The embodiments of the work apparatuses hereunder described are a backpack blower apparatus and a backpack suction apparatus.

It should be expressly understood that the illustrated embodiments are presented just as practicable examples of the invention and that the invention as defined by the claims may be broader than the illustrated embodiments described below. In the drawing, like reference characters refer to like parts so that repetitive explanations may be omitted.

Figure 1:
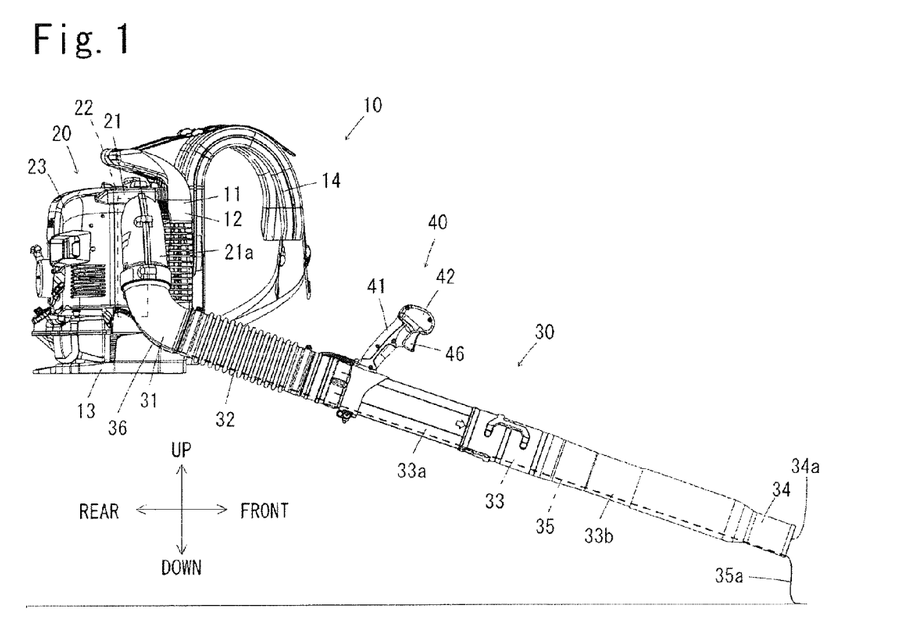
FIG. 1 is a side view of a backpack blower apparatus as a first embodiment of the present invention.

FIG. 1 illustrates a backpack blower apparatus 10, which comprises a back carrier frame 11 for being piggybacked by the user, a blower unit 20 including a blow-out duct (airflow duct) 21a and mounted on the back carrier frame 11, and an airflow tube (blowoff tube) 30 coupled to the blow-out duct 21a for blowing out air ahead.

As shown in FIG. 1, the back carrier frame 11 is for the operator to carry the blower unit 20. The back carrier frame 11 comprises a back contact member 12 for resting against the back of the operator and a base member 13 extending backward from the bottom portion of the back contact member 12 for supporting the blower unit 20, constituting a generally L-shaped configuration in the side view. To the back contact member 12 of the back carrier frame 11 are fixed a right and left shoulder straps for the operator to piggyback the work apparatus 10.

As shown in FIG. 1, the blower unit 20 is mounted on the base member 13 of the back carrier frame 11. The blower unit 20 comprises a volute casing 21 made of resin, a fan 22 made of resin and rotatably supported within the volute casing 21, and an engine (drive motor) 23 fixed on the volute casing 21 and connected to the fan 22 to drive the same. At the right side portion of the volute casing 21 is formed integrally therewith a blow-out duct 21a for blowing out air which has been sucked in from the suction aperture (not shown) provided in the front of the volute casing 21 and impelled by the fan 22. The blow-out duct 21a is coupled to the airflow tube 30 to flow the air into the latter.

The airflow tube 30 is comprised of an elbow tube 31 rotatably coupled to the blow-out duct 21a, a flexible tube 32 of a bellowslike shape coupled to the elbow tube 31, a straight tube 33 coupled to the flexible tube 32 and a nozzle tube 34 coupled to the straight tube 33 and decreased in diameter toward the distal end. The elbow tube 31, the flexible tube 32, the straight tube 33 and the nozzle tube 34 are all made of resin and fluidically communicate with each other. The straight tube 33 consists of a first straight tube 33a and a second straight tube 33b which are telescopically coupled together. The straight tube 33 is provided thereon with a grip handle (holding device) 40 at the proximal end of the first straight tube 33a which constitutes the proximal component of the straight tube 33.

Figure 2:
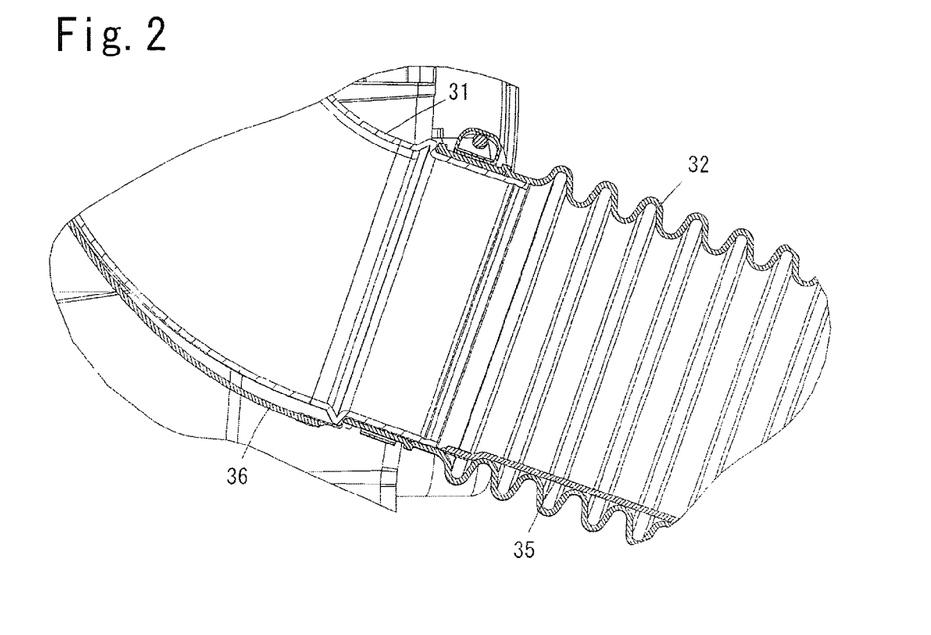
FIG. 2 is an enlarged fragmentary sectional side view of a part of FIG. 1 where the elbow tube and the flexible tube of the airflow tube are coupled.
Figure 3:
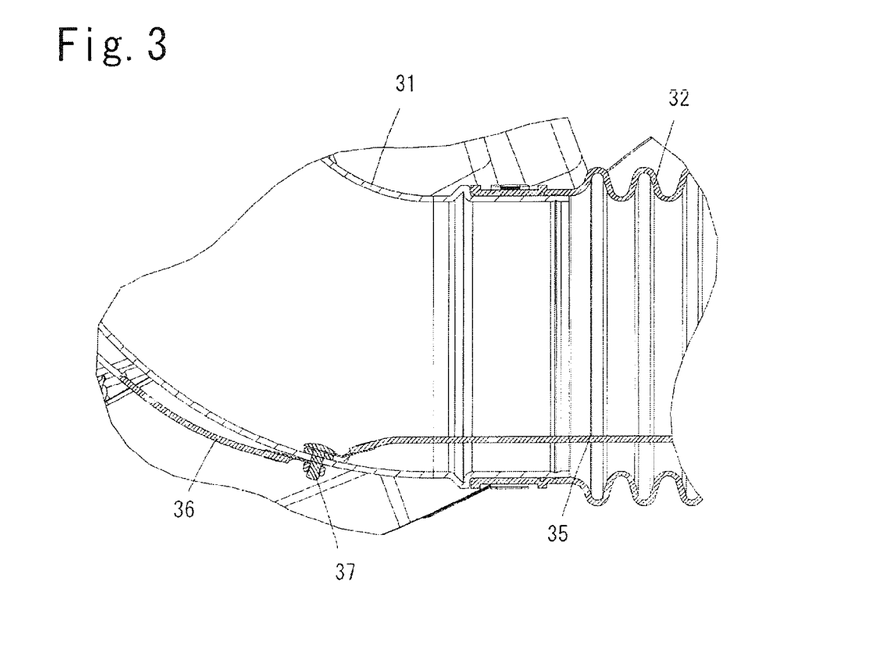
FIG. 3 is an enlarged fragmentary sectional side view of the part shown in FIG. 2, but modified in configuration.

A conductive wire 35 is provided within the airflow tube 30. As shown in FIG. 2, the proximal end portion of the conductive wire 35 is led outside through between the coaxially coupling tubular walls of the elbow tube 31 and the flexible tube 32 and is electrically connected to an outer conductive wire 36, which in turn is connected to the engine 23. On the other hand, as shown in FIG. 1, the distal end 35a of the conductive wire 35 which is provided within the airflow tube 30 droops from the open distal end 34a of the nozzle tube 34 which is the distal component of the airflow tube 30. Alternatively, as shown in FIG. 3, the proximal end of the conductive wire 35 may be electrically connected to the outer conductive wire 36 by means of a bolt 37 which penetrates the wall of the elbow tube 31 in its distal end portion.

Figure 4:
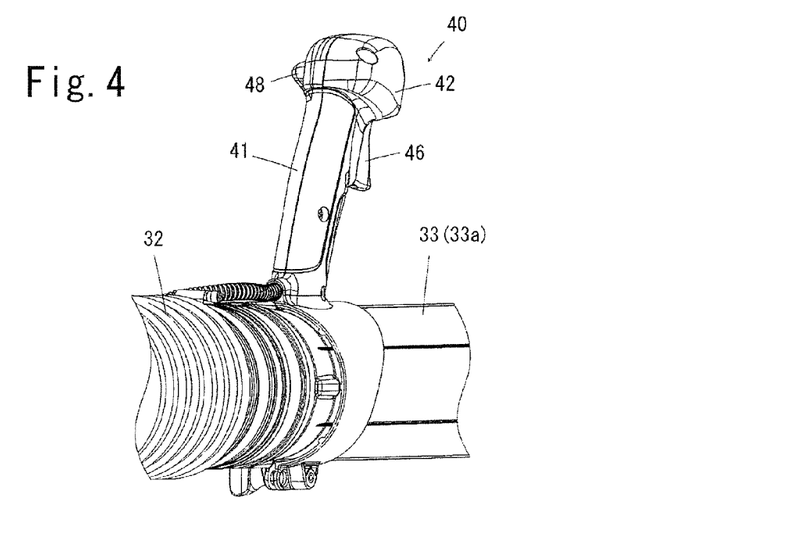
FIG. 4 is a perspective view of the grip handle of the backpack blower apparatus as viewed from the rear side of the apparatus.
Figure 5:
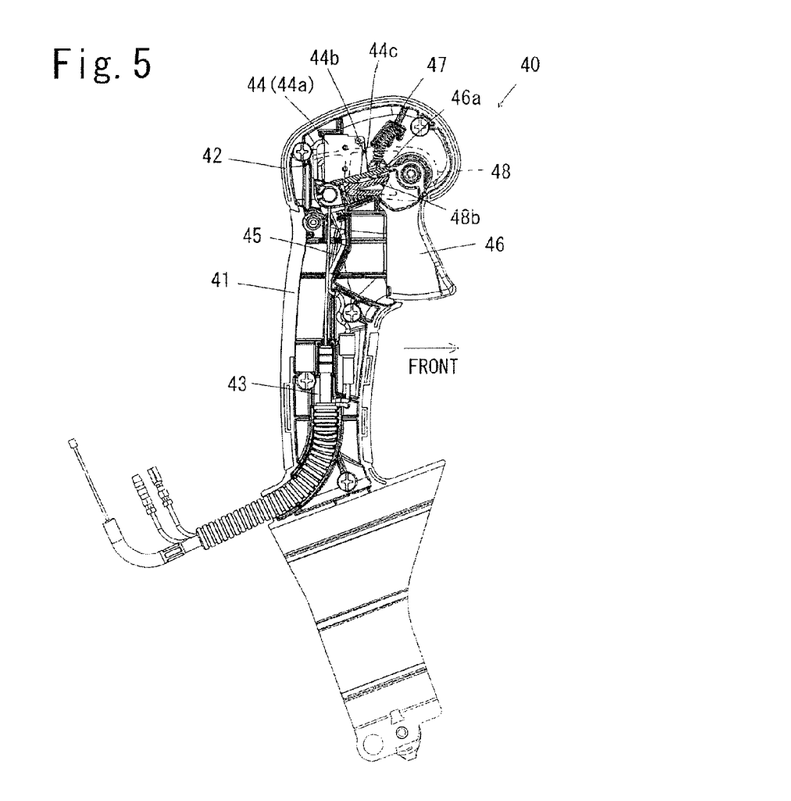
FIG. 5 is a right side view of the grip handle with its right half shell taken away to show the internal structure of the grip handle.

The grip handle 40 is to be manipulated by the operator for directing the open distal end 34a of the nozzle tube 34 of the airflow tube 30 toward an intended direction. The grip handle 40 also has a function to variably control the power of the engine 23 as well as to render the engine 23 operable or inoperable. As shown in FIGS. 4 and 5, the grip handle 40 comprises a grip portion 41 of approximately tubular shape for the operator to hold and a head portion 42 protruding forward and rightward from the grip portion 41 at the top of the grip handle 40.

As shown in FIG. 5, the grip handle 40 contains therein part of a throttle wire 43 for controlling the throttle valve of the engine 23 and a stop switch 44 constituted by a microswitch for rendering the engine 23 operatable or inoperatable. The throttle wire 43 is connected to the throttle valve (not shown) of the engine 23 so that pulling the throttle wire 43 will open the throttle valve. The stop switch 44 is connected to the ignition system (not shown) of the engine 23 via a lead wire 45 so that turning on its internal switch mechanism to shunt the electric supply will cut the electric power supply to the ignition system of the engine 23 to stop the engine 23. The stop switch 44 comprises a switch enclosure 45a including a switch mechanism (not shown), a plunger 44b for actuating the switch mechanism, and a lever 44c rotatably supported on the switch enclosure 44a. The plunger 44b is movable back and forth and is urged forward so that its forepart will protrude forward. The lever 44c is made of a metal plate member elongate vertically with its vertically intermediate point abutting the forepart of the plunger 44b, and its top end is rotatably supported at the upper part of the switch enclosure 44a. The lower end portion of the lever 44c assumes a semicircular shape swelling toward a cam 48a member (to be described later).

A throttle lever 46 is provided at the upper front side of the grip portion 41, and a stop lever 48 is provided on the left side of the head portion 42. The throttle lever 46 is to control the throttle valve of the engine 23 via the throttle wire 43, thereby to control the output power of the engine 23. The upper part of the throttle lever 46 is supported within the head portion 42 to be swingable about a horizontal transverse axis so that the lower part of the throttle lever 46 is movable back and forth. The throttle lever 46 is urged by a spring 47 so that its lower part is pushed forward. When the lower part of the throttle lever 46 is in the most frontward position, the throttle valve is in the closed state, and when the lower part of the throttle lever 46 is pressed backward against the urging force by the spring 47, i.e. when the throttle lever 46 is triggered, the throttle valve will be opened.

Figure 6A:
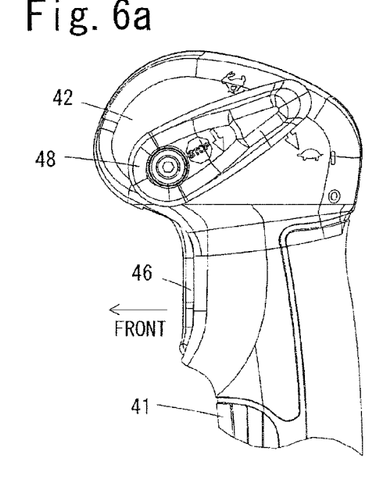
FIGS. 6a and 6b are a fragmentary left side view showing an external appearance and a fragmentary sectional right side view showing an internal structure, respectively, of the grip handle where the stop switch is in a position to render the apparatus operable.
Figure 6B:
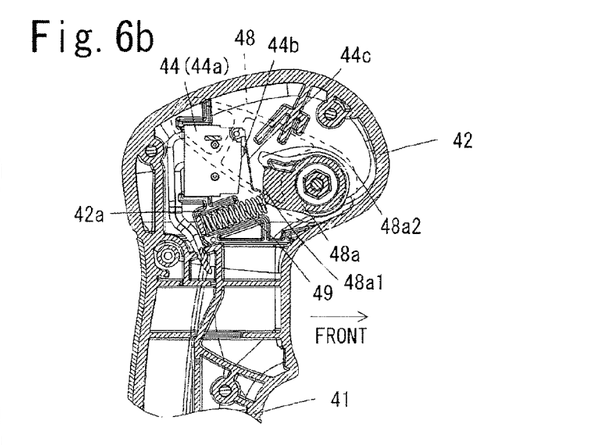

The stop lever 48 is to stop the engine 23, and also to keep the position of the throttle lever 46 to keep the output power of the engine 23 at an arbitrary state, which functions as a cruise control lever. The stop lever 48 is elongate in the front-and-rear direction on the left side of the head portion 42 with its front part being swingably supported about a horizontal transverse axis. As shown in FIGS. 5, 6b and 6d, the stop lever 48 comprises a cam member 48a and an engaging member 48b formed integrally with the cam member 48a to the right of the cam member 48a within the head portion 42, the cam member 48a and the engaging member 48b being swingable around the swing axis of the stop lever 48. The stop lever 48 is so arranged as to keep staying at an arbitrary swing position due to the friction caused by the bolt and nut swingably supporting the stop lever 48 in the head portion 42.

As shown in FIGS. 6b and 6d, the cam member 48a comprises an arcuate surface 48a1 and a protrusion 48a2 protruding outward above the arcuate surface 48a1, the arcuate surface 48a1 or the protrusion 48a2 abutting the lower end portion of the lever 44c of the stop switch 44. When the stop lever 48 is so manipulated that the rear end of the stop lever 48 is at any position other than its lowermost position, as shown in FIGS. 6a and 6b, the arcuate surface 48a1 of the cam member 48 abuts the lower end portion of the lever 44c, the lever 44c does not push the plunger 44b and therefore the switch mechanism is not actuated. Under this condition, the electric power is suppliable to the ignition system of the engine 23, and the engine 23 is in an operatable condition.

Figure 6C:
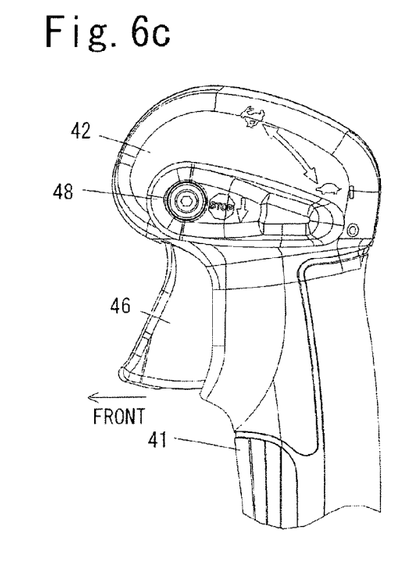
FIGS. 6c and 6d are a fragmentary left side view showing an external appearance and a fragmentary sectional right side view showing an internal structure, respectively, of the grip handle where the stop switch is in a position to render the apparatus inoperable.
Figure 6D:
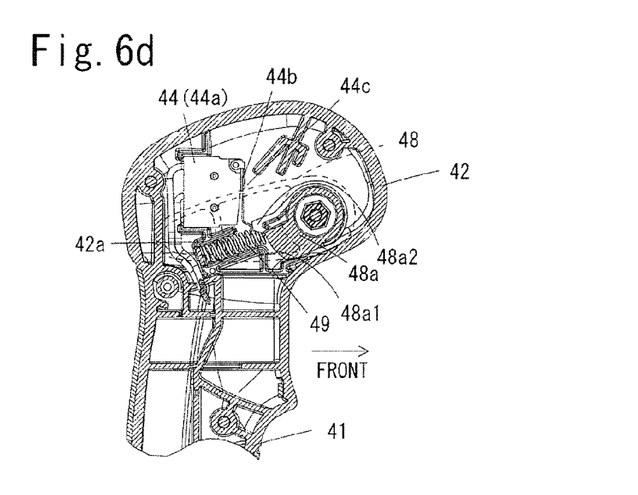

Apart from this state in which the arcuate surface 48a1 of the cam member 48 abuts the lower end portion of the lever 44c, as the rear end of the stop lever 48 is pushed down to its lowest position as shown in FIGS. 6c and 6d, the protrusion 48a2 of the cam member 48a now abuts the lower end portion of the lever 44c, and the lever 44c presses the plunger 44b to actuate the switch mechanism. In this condition, electric power is not supplied to the ignition system of the engine 23 so that the engine 23 comes to a standstill.

Further as shown in FIGS. 6b and 6d, a cuplike receptacle 42a is formed within the head portion 42, opening toward the cam member 48a. A coil spring 49 is provided in the receptacle 42a to urge the lower end portion of the lever 44c of the stop switch 44 toward the cam member 48a, thereby eliminating the backlash or clearance between the lever 44c and the cam member 48a. Thus, the manipulating force for swinging the stop lever 48 will be uniformized.

Figure 7:
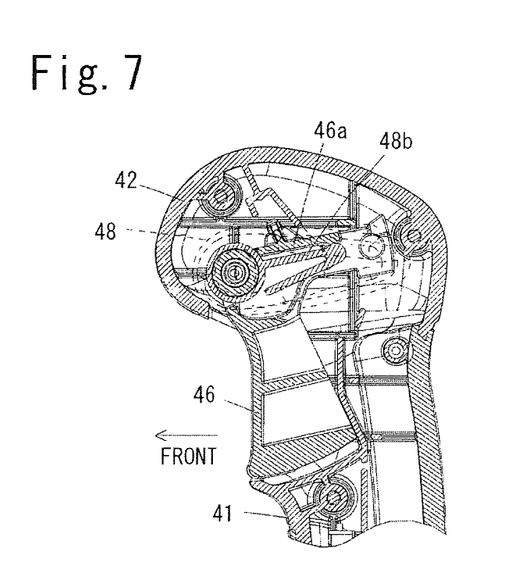
FIG. 7 is a fragmentary vertical sectional view of the grip handle showing an internal structure where the throttle lever is actuated.

As shown in FIGS. 5 and 7, the engaging member 48b of the stop lever 48 is to engage from below with an engaging member 46a formed at the upper part of the throttle lever 46 so that the throttle lever 46 is kept staying at an arbitrary swing position. This configuration provides a cruise control function.

Herein below will be described how the backpack blower apparatus 10 configured as above will operate. The operator starts the engine 23, puts the back carrier frame 11 on his/her back, holds the grip handle 40 of the airflow tube 30 with his/her right hand, manipulates the throttle lever 46 with his/her finger, and directs the open distal end 34a of the airflow tube 30 toward the ground to blow off fallen leaves on the ground. During this operation, air flows from the volute casing 21 and through and out of the airflow tube 30, and the flowing air will cause generation of electrostatic charge due to the friction between the running air and the inner circumferential wall of the volute casing 21 and of the airflow tube 30, and the electrostatic charge will be accumulated on the volute casing 21 and the airflow tube 30.

In the backpack blower apparatus 10 configured as above, the airflow tube 30 is provided therein with the conductor wire 35 which is an electrically conductive member at least in the range between the position where the grip handle 40 is provided and the open distal end 34a. Particularly in the embodiment shown, the distal end portion 35a of the conductor wire 35 droops from the open distal end 34a of the airflow tube 30 to constitute the electrically grounding member touchable to the ground. The operator simply operates the blower apparatus 10 to work at clearing the fallen leaves on the ground with the open distal end 34a of the airflow tube 30 directed toward the ground, whereby the distal end portion 35a of the conductor wire 35 will touch the ground unconsciouly. Consequently, the electrostatic charge accumulated on the airflow tube 30 will seldom attack the operator abruptly discharging from the grip handle 40 to the operator's hand, and the operator can work with the blower apparatus 10 at ease. In addition, as the open distal end 34a of the airflow tube 30 is apart from the operator when in use, the possibility of the operator stepping on the distal end portion 35a of the conductor wire 35 will be small.

With the conventional backpack blower apparatus wherein the engine is not provided with a particular electrically conductive grounding means, the electrostatic charge generated on the volute casing 21 might flow from the engine 23 through the throttle wire 43 or the lead wire 45 to abruptly discharge to the hand of the operator holding the grip handle 40.

However, with the backpack blower apparatus 10 according to the present invention wherein the proximal end of the conductor wire 35 is electrically connected to the engine 23 via the outer conductor wire 36 and the distal end 35a of the conductor wire 35 droops from the open distal end 34a of the airflow tube 30, the electrostatic charge generated on the volute casing 21 would flow from the engine 23 through the conductor wires 36 and 35 to the distal end 35a to be discharged to the ground. Thus, the possibility of the electrostatic charge accumulated on the engine 23 flowing through the electrically conductive control wire such as the throttle wire 43 and the lead wire 45 and abruptly discharging to the operator's hand will be eliminated. While electrostatic charges are liable to be generated on the elbow tube 31 of the airflow tube 30 particularly due to the friction of the flowing air against the curved inner circumferential wall, the generated electrostatic charge could be taken in from the connecting site of the conductor wires 36 and 35, and would be discharged to the ground via the conductor wire 35. This configuration effectively serves to eliminate the electrostatic discharge liable to be generated on the elbow tube 31.

Figure 8:
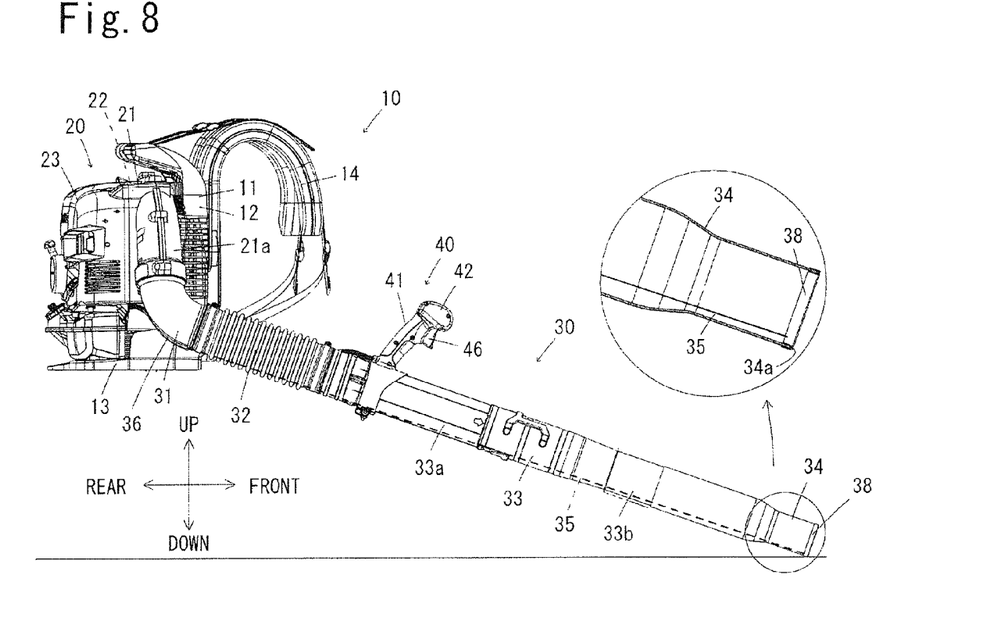
FIG. 8 is a side view of a backpack blower apparatus as a second embodiment of the present invention.

As an alternative embodiment, the open distal end 34a of the airflow tube 30 may be provided with an electrically conductive ring 38 fixed to the edge thereof, as shown in FIG. 8, in which the conductor wire 35 is electrically connected to the ring 38. With this alternative configuration, the operator would work at blowing off fallen leaves on the ground with the ring 38 touching the ground from time to time thereby discharging the accumulated electrostatic charge from the ring 38 to the ground. In addition, where the ring 38 is made of metal, the open distal end 34a of the airflow tube 30 will be prevented from being abraded. Where the straight tube 33 of the airflow tube 30 is comprised of a first straight tube 33a and a second straight tube 33b which are telescopically coupled together to make the length of the straight tube 33 variable, which means the length of the airflow tube 30 will be changed depending on the operator's convenience, the length of the conductor wire 35 may be determined to meet the length of the airflow tube 30 when the straight tube 33 is adjusted longest, or the conductor wire 35 may be formed with an electrically conductive coil spring inserted in the intermediate part thereof.

From the viewpoint of an object to prevent the distal end of the airflow tube 30 from abrasion, the invention can be defined to be of the following structure. Namely, the work apparatus (blower apparatus or suction apparatus) comprises a blower unit 20 including a drive motor 23, a volute casing 21, a fan 22 rotatably supported within the volute casing 21 and driven by the drive motor 23, and an airflow duct 21a connected to the volute casing 21, thereby blowing out or sucking in air through the airflow duct 21a, and comprises an airflow tube 30 coupled to the airflow duct 21a and having an open distal end 34a circumferentially covered by a member made of a material having a high hardness. Such a configuration will effectively prevent the open distal end 34a of the airflow tube 30 from being abraded, while the open distal end 34a of the airflow tube 30 is apt to touch the ground unconsciously while in use. The member with a high hardness may preferably be formed by the above described metal ring 38 and may preferably be detachable to the open distal end 34a of the airflow tube 30 so that the ring 38 (high hardness member) can be replaced depending on its abrasion.

While the above described embodiment comprises the conductive wire 35 provided within the airflow tube 30 as the electrically conductive member to be arranged within the airflow tube 30 at least in the range between the position where the grip handle (holding device) 40 is provided and the open distal end 34a of the airflow tube 30, the present invention is not necessarily be limited to such an embodiment, but may be practiced with an airflow tube 30 made of an electrically conductive resin material itself at least in the range between the position where the grip handle 40 is provided and the open distal end 34a (or may be the entirety) of the airflow tube 30, or may alternatively be practiced with an airflow tube 30 of which the inner wall surface is coated with electrically conductive paint at least in the range between the position where the grip handle 40 is provided and the open distal end 34a (or may be the entirety) of the airflow tube 30, whereby the same merit of the present invention will be enjoyed.

Figure 9:
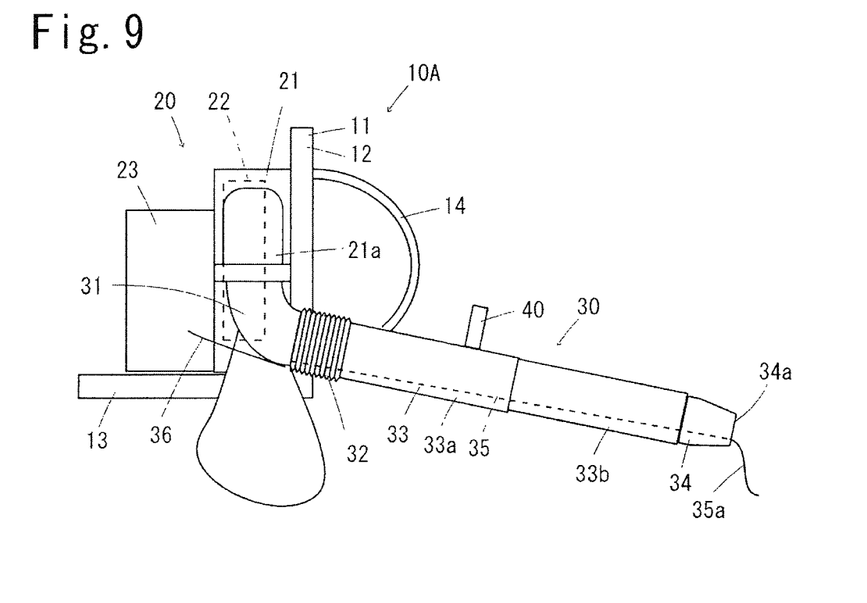
FIG. 9 is a schematic side view of a backpack suction apparatus as a third embodiment of the present invention.

While the invention has been described about a backpack blower apparatus 10 as an embodiment of the work apparatus, the present invention is not necessarily limited to a backpack blower apparatus, but may be practiced as a backpack suction apparatus 10A, as shown in FIG. 9, which comprises a blower unit 20 including a drive motor (engine) 23, a volute casing 21, a fan 22 rotatably supported within the volute casing 21 and driven by the drive motor 23, and an airflow duct (sucking-in duct) 21a connected to the volute casing 21 for sucking in air through the airflow duct 21a, and which further comprises an airflow tube 30 coupled to the airflow duct 21a of the blower unit 20 and provided with a grip handle (holding device) 40 for being held and operated by the operator. In such a suction apparatus 10A, the configuration for discharging the accumulated electrostatic charge including the electrically conductive member arranged within the airflow tube 30 and the ring 38 provided at the open distal end 34a of the airflow tube 30 is the same as in the above described embodiment of the backpack blower apparatus 10, and the detailed description is omitted herein.

It should be understood that drive motor 23 is not limited to an internal combustion engine, but may be an electric motor energized by an electric power supplied from a battery or else.

What is claimed is:

1. A work apparatus comprising:
   a blower unit including a drive motor, a volute casing, a fan rotatably supported within the volute casing and driven by the drive motor, and an airflow duct connected to the volute casing, thereby blowing out or sucking in air through the airflow duct;
   an airflow tube coupled to the airflow duct of the blower unit and having an open distal end for blowing out or sucking in air through the airflow tube, the airflow tube being provided with a holding device configured to be held and operated when in use;
   an electrically conductive member arranged within the airflow tube at least in a range between a position where the holding device is provided and the open distal end of the airflow tube; and
   an electrically grounding member provided at the open distal end of the airflow tube and electrically connected to the electrically conductive member, the electrically grounding member being configured to ground an electrostatic charge,
   wherein the electrically grounding member is an electrically conductive ring fitted and fixed to the open distal end of the airflow tube.

2. The work apparatus as claimed in claim 1, wherein the electrically conductive ring is made of electrically conductive metal.

3. The work apparatus as claimed in claim 1, wherein the electrically conductive member is made of an electrically conductive wire extending from the position where the holding device is provided to the open distal end of the airflow tube.

4. The work apparatus as claimed in claim 3, wherein the electrically conductive wire has a first end which is electrically connected to the drive motor.

5. The work apparatus as claimed in claim 4, wherein the electrically conductive ring is made of electrically conductive metal.

6. The work apparatus as claimed in claim 3, wherein the electrically conductive ring is made of electrically conductive metal.

* * * * *